US012718005B2

(12) United States Patent
Schafer et al.

(10) Patent No.: US 12,718,005 B2
(45) Date of Patent: Aug. 25, 2026

(54) SYSTEM, METHOD, AND COMPUTER PROGRAM PRODUCT FOR IDENTIFYING AND REPRESENTING EVENTS USING A MACHINE-LEARNING MODEL

(71) Applicant: Clearbrief, Inc., Seattle, WA (US)

(72) Inventors: Jacqueline Grace Schafer, Seattle, WA (US); Jose Demetrio Saura, Covington, WA (US); En-Jui Chang, Seattle, WA (US); Jiajie Yan, Seattle, WA (US)

(73) Assignee: Clearbrief, Inc., Seattle, WA (US)

( * ) Notice: Subject to any disclaimer, the term of this patent is extended or adjusted under 35 U.S.C. 154(b) by 0 days.

(21) Appl. No.: 19/090,578

(22) Filed: Mar. 26, 2025

(65) Prior Publication Data

US 2025/0307531 A1 Oct. 2, 2025

Related U.S. Application Data

(60) Provisional application No. 63/569,819, filed on Mar. 26, 2024.

(51) Int. Cl.

| | |
|---|---|
| ***G06F 40/166*** | (2020.01) |
| ***G06F 3/0482*** | (2013.01) |
| ***G06F 16/34*** | (2025.01) |
| ***G06F 40/205*** | (2020.01) |

(52) U.S. Cl.

CPC .......... *G06F 40/166* (2020.01); *G06F 3/0482* (2013.01); *G06F 16/345* (2019.01); *G06F 40/205* (2020.01)

(58) Field of Classification Search

CPC ..................................................... G06F 40/166

See application file for complete search history.

(56) References Cited

U.S. PATENT DOCUMENTS

| | | | | |
|---|---|---|---|---|
| 9,632,654 | B1 | 4/2017 | Elassaad | |
| 9,852,195 | B2 | 12/2017 | Ma et al. | |
| 11,423,073 | B2 | 8/2022 | Kikin-Gil | |
| 11,941,237 | B2 | 3/2024 | Weskamp | |
| 2002/0089533 | A1 * | 7/2002 | Hollaar et al. | G09G 5/00 |

(Continued)

FOREIGN PATENT DOCUMENTS

| | | |
|---|---|---|
| CN | 110879842 A | 3/2020 |
| CN | 111611396 A | 9/2020 |

(Continued)

*Primary Examiner* — James J Debrow

(74) *Attorney, Agent, or Firm* — The Webb Law Firm

(57) ABSTRACT

Provided are systems, methods, and computer program products for identifying and representing events. A system includes a processor configured to parse a textual document to identify a plurality of events associated with a plurality of document citations, extract, from at least one source document for each document citation of the plurality of document citations, an event summary and at least one temporal parameter for an event of the plurality of events corresponding to the at least one source document by inputting at least a portion of the at least one source document into a machine-learning model, order the plurality of events into a sequence based on the at least one temporal parameter for each event, generate an interactive graphical user interface comprising event summaries for each event on a user device based on the sequence, and generate a narrative summary.

19 Claims, 8 Drawing Sheets

(56) References Cited

U.S. PATENT DOCUMENTS

| | | | | |
|---|---|---|---|---|
| 2004/0027349 | A1* | 2/2004 | Landau et al. | G06T 11/20 |
| 2007/0136272 | A1* | 6/2007 | Tveit | G06F 17/30 |
| 2008/0059466 | A1* | 3/2008 | Luo et al. | G06F 7/00 |
| 2008/0243825 | A1 | 10/2008 | Staddon et al. | |
| 2009/0326926 | A1 | 12/2009 | Landau | |
| 2010/0318398 | A1 | 12/2010 | Brun | |
| 2013/0054613 | A1 | 2/2013 | Bishop | |
| 2016/0041961 | A1* | 2/2016 | Romney | G06F 17/241 |
| 2017/0177556 | A1* | 6/2017 | Fay et al. | G06F 17/241 |
| 2017/0277779 | A1 | 9/2017 | Vogel | |
| 2017/0351754 | A1 | 12/2017 | Devarakonda | |
| 2019/0354579 | A1 | 11/2019 | Kerr et al. | |
| 2020/0090053 | A1 | 3/2020 | Silverman et al. | |
| 2020/0134757 | A1 | 4/2020 | Raphael et al. | |
| 2020/0151392 | A1 | 5/2020 | Crabtree et al. | |
| 2020/0394057 | A1 | 12/2020 | Dobson | |
| 2022/0343250 | A1 | 10/2022 | Tremblay | |
| 2024/0220063 | A1* | 7/2024 | Sutrave et al. | G06F 3/0481 |
| 2024/0242037 | A1* | 7/2024 | Heller et al. | G06F 40/40 |

FOREIGN PATENT DOCUMENTS

| | | |
|---|---|---|
| CN | 112581327 A | 3/2021 |
| CN | 112632223 A | 4/2021 |

* cited by examiner

SYSTEM, METHOD, AND COMPUTER PROGRAM PRODUCT FOR IDENTIFYING AND REPRESENTING EVENTS USING A MACHINE-LEARNING MODEL

CROSS REFERENCE TO RELATED APPLICATION

This application claims priority to U.S. Patent Application No. 63/569,819, filed on Mar. 26, 2024, the disclosure of which is hereby incorporated by reference in its entirety.

BACKGROUND

1. Field

This disclosure relates generally to identifying events and representing events from electronic documents and, in non-limiting embodiments, to systems, methods, and computer program products for identifying and representing events using a machine-learning model.

2. Technical Considerations

Law firms prepare legal documents, such as legal briefs, pleadings, and opinions. Their clients also prepare legal documents, such as internal memorandums prepared by in-house counsel or a human resources report relating to a harassment or other employee-related complaint, for example. Such documents are also prepared for courts, police officers, insurance claims, and/or the like. These types of legal documents need to report facts accurately and consistently.

A timeline provides a clear visual presentation of a case. It helps readers understand the circumstances and the chronological order of key facts. There are different tools generating a timeline in different formats and with a variety of visual effects. Existing timeline generation tools (Adobe Flash®, PowerPoint™, Keynote®, BeeDocs) are limited to the visual representation of timeline data. There is manual labor involved in selecting key dates and entering data in these tools. Moreover, existing e-discovery tools allow users to manually add documents to an interface to create a chronology of documents, but such tools are prone to human error and do not involve a primary document being edited in a word processing application.

SUMMARY

According to non-limiting embodiments or aspects, provided is a system comprising: at least one processor configured to: parse at least one textual document to identify a plurality of events associated with a plurality of document citations, each document citation of the plurality of document citations corresponding to at least one source document; extract, from at least one source document for each document citation of the plurality of document citations, an event summary and at least one temporal parameter for an event of the plurality of events corresponding to the at least one source document by inputting at least a portion of the at least one source document into a machine-learning model; order the plurality of events into a sequence based on the at least one temporal parameter for each event; generate an interactive graphical user interface comprising event summaries for each event on a user device based on the sequence; and generate a narrative summary based on the event summaries for each event and the sequence.

In non-limiting embodiments or aspects, extracting the event summary and the at least one temporal parameter comprises: prompting the machine-learning model to return a plurality of temporal parameters as separate fields in a data structure, the at least one temporal parameter is returned. In non-limiting embodiments or aspects, prompting the machine-learning model to return the plurality of temporal parameters as separate fields comprises instructing the machine-learning model to return a null value in the data structure for any temporal parameters of the plurality of temporal parameters that are not identified in the at least one source document. In non-limiting embodiments or aspects, the plurality of temporal parameters comprise at least two of the following: year, month, day, hour, minute, and/or second. In non-limiting embodiments or aspects, extracting the event summary and the at least one temporal parameter comprises: splitting the at least one source document into a plurality of portions; assigning a unique identifier to each portion of the plurality of portions, resulting in a plurality of unique identifiers; and prompting the machine-learning model to reference the unique identifier in association with the event summary and/or the at least one temporal parameter, wherein ordering the plurality of events into the sequence is based at least partially on the plurality of unique identifiers. In non-limiting embodiments or aspects, the at least one processor is further configured to: generate a data structure comprising an association between each portion of the plurality of portions and a unique identifier of the plurality of unique identifiers, wherein inputting the at least a portion of the at least one source document into the machine-learning model comprises inputting the data structure into the machine-learning model when prompting the machine-learning model. In non-limiting embodiments or aspects, the at least one processor is further configured to: modify the sequence and/or at least one event summary based on user input to the interactive graphical user interface before generating the narrative summary. In non-limiting embodiments or aspects, the at least one processor is further configured to: receive a user selection from a plurality of selectable options, each option of the plurality of selectable options corresponding to a separate type of narrative summary, the narrative summary is generated based on a selected type of narrative summary. In non-limiting embodiments or aspects, generating the narrative summary comprises: identifying a template corresponding to the selected type of narrative summary from a plurality of different templates; and prompting the machine-learning model with the template. In non-limiting embodiments or aspects, generating the narrative summary comprises: generating a data structure comprising the event summaries for each event; and inputting the data structure into the machine-learning model.

According to non-limiting embodiments or aspects, provided is a method for representing a plurality of events in an interactive graphical user interface, comprising: parsing at least one textual document to identify a plurality of events associated with a plurality of document citations, each document citation of the plurality of document citations corresponding to at least one source document; extracting, from at least one source document for each document citation of the plurality of document citations, an event summary and at least one temporal parameter for an event of the plurality of events corresponding to the at least one source document by inputting at least a portion of the at least one source document into a machine-learning model; ordering the plurality of events into a sequence based on the at least one temporal parameter for each event; generating an interactive graphical user interface comprising event summaries for each event on a user device based on the sequence; and generating a narrative summary based on the event summaries for each event and the sequence.

In non-limiting embodiments or aspects, extracting the event summary and the at least one temporal parameter comprises: prompting the machine-learning model to return a plurality of temporal parameters as separate fields in a data structure, the at least one temporal parameter is returned. In non-limiting embodiments or aspects, prompting the machine-learning model to return the plurality of temporal parameters as separate fields comprises instructing the machine-learning model to return a null value in the data structure for any temporal parameters of the plurality of temporal parameters that are not identified in the at least one source document. In non-limiting embodiments or aspects, the plurality of temporal parameters comprise at least two of the following: year, month, day, hour, minute, and/or second. In non-limiting embodiments or aspects, extracting the event summary and the at least one temporal parameter comprises: splitting the at least one source document into a plurality of portions; assigning a unique identifier to each portion of the plurality of portions, resulting in a plurality of unique identifiers; and prompting the machine-learning model to reference the unique identifier in association with the event summary and/or the at least one temporal parameter, wherein ordering the plurality of events into the sequence is based at least partially on the plurality of unique identifiers. In non-limiting embodiments or aspects, the method further includes: generating a data structure comprising an association between each portion of the plurality of portions and a unique identifier of the plurality of unique identifiers, wherein inputting the at least a portion of the at least one source document into the machine-learning model comprises inputting the data structure into the machine-learning model when prompting the machine-learning model. In non-limiting embodiments or aspects, the method further includes: modifying the sequence and/or at least one event summary based on user input to the interactive graphical user interface before generating the narrative summary. In non-limiting embodiments or aspects, the method further includes: receiving a user selection from a plurality of selectable options, each option of the plurality of selectable options corresponding to a separate type of narrative summary, the narrative summary is generated based on a selected type of narrative summary. In non-limiting embodiments or aspects, generating the narrative summary comprises: identifying a template corresponding to the selected type of narrative summary from a plurality of different templates; and prompting the machine-learning model with the template. In non-limiting embodiments or aspects, generating the narrative summary comprises: generating a data structure comprising the event summaries for each event; and inputting the data structure into the machine-learning model.

According to non-limiting embodiments or aspects, provided is a computer program product comprising a non-transitory computer-readable medium including program instructions that, when executed by at least one processor, cause the at least one processor to: parse at least one textual document to identify a plurality of events associated with a plurality of document citations, each document citation of the plurality of document citations corresponding to at least one source document; extract, from at least one source document for each document citation of the plurality of document citations, an event summary and at least one temporal parameter for an event of the plurality of events corresponding to the at least one source document by inputting at least a portion of the at least one source document into a machine-learning model; order the plurality of events into a sequence based on the at least one temporal parameter for each event; generate an interactive graphical user interface comprising event summaries for each event on a user device based on the sequence; and generate a narrative summary based on the event summaries for each event and the sequence Other non-limiting embodiments or aspects will be set forth in the following numbered clauses:

Clause 1: A system comprising: at least one processor configured to: parse at least one textual document to identify a plurality of events associated with a plurality of document citations, each document citation of the plurality of document citations corresponding to at least one source document; extract, from at least one source document for each document citation of the plurality of document citations, an event summary and at least one temporal parameter for an event of the plurality of events corresponding to the at least one source document by inputting at least a portion of the at least one source document into a machine-learning model; order the plurality of events into a sequence based on the at least one temporal parameter for each event; generate an interactive graphical user interface comprising event summaries for each event on a user device based on the sequence; and generate a narrative summary based on the event summaries for each event and the sequence.

Clause 2: The system of clause 1, wherein extracting the event summary and the at least one temporal parameter comprises: prompting the machine-learning model to return a plurality of temporal parameters as separate fields in a data structure, wherein the at least one temporal parameter is returned.

Clause 3: The system of clause 1 or 2, wherein prompting the machine-learning model to return the plurality of temporal parameters as separate fields comprises instructing the machine-learning model to return a null value in the data structure for any temporal parameters of the plurality of temporal parameters that are not identified in the at least one source document.

Clause 4: The system of any of clauses 1-3, wherein the plurality of temporal parameters comprise at least two of the following: year, month, day, hour, minute, and/or second.

Clause 5: The system of any of clauses 1-4, wherein extracting the event summary and the at least one temporal parameter comprises: splitting the at least one source document into a plurality of portions; assigning a unique identifier to each portion of the plurality of portions, resulting in a plurality of unique identifiers; and prompting the machine-learning model to reference the unique identifier in association with the event summary and/or the at least one temporal parameter, wherein ordering the plurality of events into the sequence is based at least partially on the plurality of unique identifiers.

Clause 6: The system of any of clauses 1-5, wherein the at least one processor is further configured to: generate a data structure comprising an association between each portion of the plurality of portions and a unique identifier of the plurality of unique identifiers, wherein inputting the at least a portion of the at least one source document into the machine-learning model comprises inputting the data structure into the machine-learning model when prompting the machine-learning model.

Clause 7: The system of any of clauses 1-6, wherein the at least one processor is further configured to: modify the sequence and/or at least one event summary based on user input to the interactive graphical user interface before generating the narrative summary.

Clause 8: The system of any of clauses 1-7, wherein the at least one processor is further configured to: receive a user selection from a plurality of selectable options, each option of the plurality of selectable options corresponding to a separate type of narrative summary, wherein the narrative summary is generated based on a selected type of narrative summary.

Clause 9: The system of any of clauses 1-8, wherein generating the narrative summary comprises: identifying a template corresponding to the selected type of narrative summary from a plurality of different templates; and prompting the machine-learning model with the template.

Clause 10: The system of any of clauses 1-9, wherein generating the narrative summary comprises: generating a data structure comprising the event summaries for each event; and inputting the data structure into the machine-learning model.

Clause 11: A method for representing a plurality of events in an interactive graphical user interface, comprising: parsing at least one textual document to identify a plurality of events associated with a plurality of document citations, each document citation of the plurality of document citations corresponding to at least one source document; extracting, from at least one source document for each document citation of the plurality of document citations, an event summary and at least one temporal parameter for an event of the plurality of events corresponding to the at least one source document by inputting at least a portion of the at least one source document into a machine-learning model; ordering the plurality of events into a sequence based on the at least one temporal parameter for each event; generating an interactive graphical user interface comprising event summaries for each event on a user device based on the sequence; and generating a narrative summary based on the event summaries for each event and the sequence.

Clause 12: The method of clause 11, wherein extracting the event summary and the at least one temporal parameter comprises: prompting the machine-learning model to return a plurality of temporal parameters as separate fields in a data structure, wherein the at least one temporal parameter is returned.

Clause 13: The method of clause 11 or 12, wherein prompting the machine-learning model to return the plurality of temporal parameters as separate fields comprises instructing the machine-learning model to return a null value in the data structure for any temporal parameters of the plurality of temporal parameters that are not identified in the at least one source document.

Clause 14: The method of any of clauses 11-13, wherein the plurality of temporal parameters comprise at least two of the following: year, month, day, hour, minute, and/or second.

Clause 15: The method of any of clauses 11-14, wherein extracting the event summary and the at least one temporal parameter comprises: splitting the at least one source document into a plurality of portions; assigning a unique identifier to each portion of the plurality of portions, resulting in a plurality of unique identifiers; and prompting the machine-learning model to reference the unique identifier in association with the event summary and/or the at least one temporal parameter, wherein ordering the plurality of events into the sequence is based at least partially on the plurality of unique identifiers.

Clause 16: The method of any of clauses 11-15, further comprising: generating a data structure comprising an association between each portion of the plurality of portions and a unique identifier of the plurality of unique identifiers, wherein inputting the at least a portion of the at least one source document into the machine-learning model comprises inputting the data structure into the machine-learning model when prompting the machine-learning model.

Clause 17: The method of any of clauses 11-16, further comprising: modifying the sequence and/or at least one event summary based on user input to the interactive graphical user interface before generating the narrative summary.

Clause 18: The method of any of clauses 11-17, further comprising: receiving a user selection from a plurality of selectable options, each option of the plurality of selectable options corresponding to a separate type of narrative summary, wherein the narrative summary is generated based on a selected type of narrative summary.

Clause 19: The method of any of clauses 11-18, wherein generating the narrative summary comprises: identifying a template corresponding to the selected type of narrative summary from a plurality of different templates; and prompting the machine-learning model with the template.

Clause 20: The method of any of clauses 11-19, wherein generating the narrative summary comprises: generating a data structure comprising the event summaries for each event; and inputting the data structure into the machine-learning model.

Clause 21: A computer program product comprising a non-transitory computer-readable medium including program instructions that, when executed by at least one processor, cause the at least one processor to: parse at least one textual document to identify a plurality of events associated with a plurality of document citations, each document citation of the plurality of document citations corresponding to at least one source document; extract, from at least one source document for each document citation of the plurality of document citations, an event summary and at least one temporal parameter for an event of the plurality of events corresponding to the at least one source document by inputting at least a portion of the at least one source document into a machine-learning model; order the plurality of events into a sequence based on the at least one temporal parameter for each event; generate an interactive graphical user interface comprising event summaries for each event on a user device based on the sequence; and generate a narrative summary based on the event summaries for each event and the sequence These and other features and characteristics of the present disclosure, as well as the methods of operation and functions of the related elements of structures and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention.

BRIEF DESCRIPTION OF THE DRAWINGS

Additional advantages and details are explained in greater detail below with reference to the non-limiting, exemplary embodiments that are illustrated in the accompanying figures, in which.

DESCRIPTION OF THE PREFERRED EMBODIMENTS

Figure 1A:
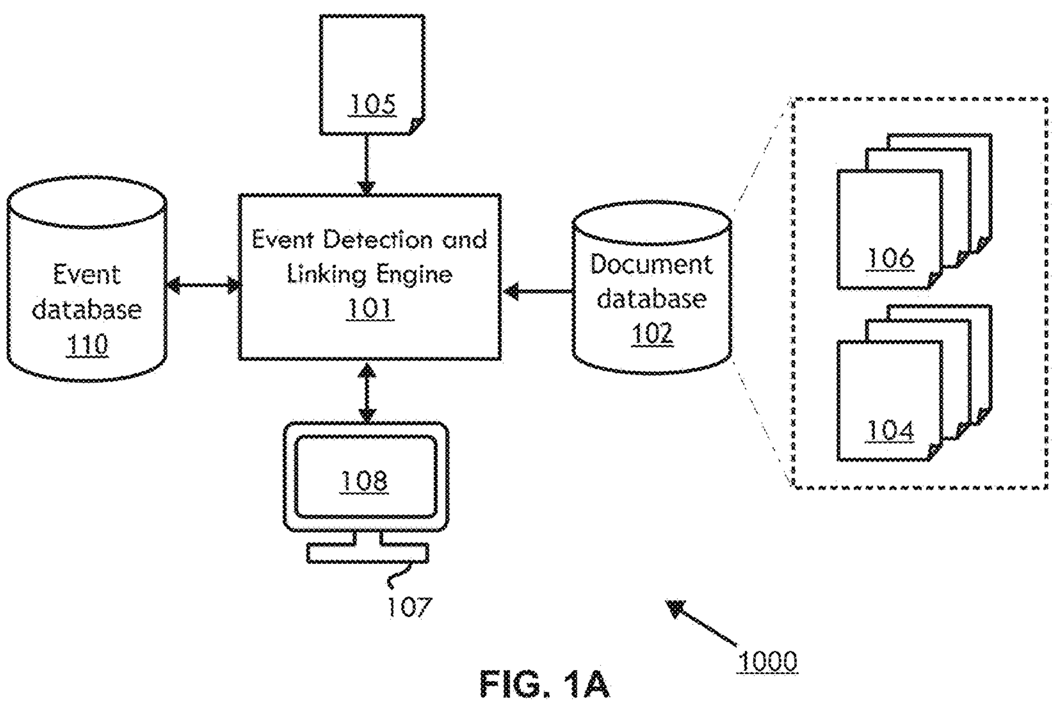
FIG. 1A is a schematic diagram of a system for identifying events in electronic documents and for representing events in an interactive graphical user interface according to non-limiting embodiments.

For purposes of the description hereinafter, the terms "end," "upper," "lower," "right," "left," "vertical," "horizontal," "top," "bottom," "lateral," "longitudinal," and derivatives thereof shall relate to the embodiments as they are oriented in the drawing figures. However, it is to be understood that the embodiments may assume various alternative variations and step sequences, except where expressly specified to the contrary. It is also to be understood that the specific devices and processes illustrated in the attached drawings, and described in the following specification, are simply exemplary embodiments or aspects of the invention. Hence, specific dimensions and other physical characteristics related to the embodiments or aspects disclosed herein are not to be considered as limiting.

No aspect, component, element, structure, act, step, function, instruction, and/or the like used herein should be construed as critical or essential unless explicitly described as such. Also, as used herein, the articles "a" and "an" are intended to include one or more items and may be used interchangeably with "one or more" and "at least one." Furthermore, as used herein, the term "set" is intended to include one or more items (e.g., related items, unrelated items, a combination of related and unrelated items, and/or the like) and may be used interchangeably with "one or more" or "at least one." Where only one item is intended, the term "one" or similar language is used. Also, as used herein, the terms "has," "have," "having," or the like are intended to be open-ended terms. Further, the phrase "based on" is intended to mean "based at least partially on" unless explicitly stated otherwise.

As used herein, the term "communication" may refer to the reception, receipt, transmission, transfer, provision, and/or the like of data (e.g., information, signals, messages, instructions, commands, and/or the like). For one unit (e.g., a device, a system, a component of a device or system, combinations thereof, and/or the like) to be in communication with another unit means that the one unit is able to directly or indirectly receive information from and/or transmit information to the other unit. This may refer to a direct or indirect connection (e.g., a direct communication connection, an indirect communication connection, and/or the like) that is wired and/or wireless in nature. Additionally, two units may be in communication with each other even though the information transmitted may be modified, processed, relayed, and/or routed between the first and second unit. For example, a first unit may be in communication with a second unit even though the first unit passively receives information and does not actively transmit information to the second unit. As another example, a first unit may be in communication with a second unit if at least one intermediary unit processes information received from the first unit and communicates the processed information to the second unit.

As used herein, the term "computing device" may refer to one or more electronic devices configured to process data. A computing device may, in some examples, include the necessary components to receive, process, and output data, such as a processor, a display, a memory, an input device, a network interface, and/or the like. A computing device may be one or more processors, mobile devices, stationary computers, server computers, or the like. As used herein, the term "server computer" may refer to or include one or more computing devices that are operated by or facilitate communication and processing for multiple parties in a network environment, such as the Internet, although it will be appreciated that communication may be facilitated over one or more public or private network environments and that various other arrangements are possible. Further, multiple computing devices directly or indirectly communicating in the network environment may constitute a "system." Reference to "a server" or "a processor," as used herein, may refer to a previously-recited server and/or processor that is recited as performing a previous step or function, a different server and/or processor, and/or a combination of servers and/or processors. For example, as used in the specification and the claims, a first processor that is recited as performing a first step or function may refer to the same or different processor recited as performing a second step or function.

Non-limiting embodiments provide a system, method, and computer program product for identifying events in electronic documents and for representing events in an interactive graphical user interface (GUI). Non-limiting embodiments provide for improved word processing applications and databases through the generation of graph data structures that enable dynamic data applications, including a timeline representation of events identified from one or more documents. Moreover, the interactive GUI(s) enabled by non-limiting embodiments described herein permit users to generate customizable views and arrangements by directly interacting with a word processing application and dynamically updating based on changes. Various other improvements and advantages may be realized with the systems, methods, and computer program products described herein.

FIG. 1A depicts a system 1000 for identifying events and representing events in an interactive GUI according to some non-limiting embodiments. The system 1000 includes an event detection and linking engine 100, which may include one or more computing devices and/or software applications executed by one or more computing devices. The event detection and linking engine 100 is in communication with a document database 102 which may be local or remote to the event detection and linking engine 100. The document database 102 may include one or more databases arranged on one or more data storage devices in various locations. In non-limiting embodiments, the document database 102 includes legal documents 106 (e.g., briefs, pleadings, and other writings) and evidentiary documents 104. It will be appreciated that various document databases may be in communication with the event detection and linking engine 100. For example, a public and/or private document database (not shown in FIG. 1A) may include court databases, legal authority databases, information resources, and/or the like and may be accessed via one or more Application Program Interfaces (APIs) allowing the document database(s) to be queried over a network connection (e.g., over the Internet).

With continued reference to FIG. 1A, the event detection and linking engine 100 is also in communication with an event database 110 which may be local or remote to the event detection and linking engine 100. The event database 110 stores one or more graph data structures and/or other types of data structures representing entities and relationships between entities, including event entities. For example, the event database 110 may store data representing a plurality of event entities, where each event entity represents an event and may include event parameters such as event type, event date, event subject, event object, event action, event participants, and/or the like. In non-limiting embodiments, an event entity includes structured data and/or a subset of associated data within a data structure that includes event data for one or more event parameters.

Still referring to FIG. 1A, the event detection and linking engine 100 is configured to process one or more target documents 105 (e.g., a textual document). The target document 105 may be a brief, a section of a brief (e.g., a statement or summary of facts and/or a section selected by the user), a pleading, a memorandum, and/or the like. The target document 105 in some examples may be part of the legal documents 106 in the document database 102. In non-limiting embodiments, the event detection and linking engine 100 is configured to parse the target document 105 to identify events (e.g., mentions of and/or references to events), link portions of the document 105 that relate to the same event into a single event entity (a new event entity or an existing event entity from the event database 110), and generate a timeline of events on an interactive graphical user interface (GUI) 108 of a user computing device 107.

In non-limiting embodiments, the event detection and linking engine 100 is configured to differentiate between unique events (e.g., different event entities). For example, if multiple mentions of an event (text strings mentioning and/or referencing an event, such as portions and/or segments of the textual document 105) appear in the textual document 105, all of those separate mentions may be associated to the same event entity. This may be performed through an individualized assessment of relevance, in which each portion of the document is separately processed and analyzed to assess whether it falls within the scope of an existing event entity and, in response to determining that it does, associating (e.g., linking) the mention (e.g., a segment of the textual document 105) to the event entity. During the parsing, the event entities are stored in an event database 110, such as a knowledge graph. Determining whether a particular string relates to an existing event in the database involves determining which mentions of an event are associated with an existing event entity of the event database 110 (e.g., querying the event database based on the mention) and which mentions are not associated with an existing event entity. If a mention is not associated with an existing event entity, a new event entity may be automatically generated and added to the event database 110. Such determinations avoid the creation of duplicate records for a same event that is mentioned multiple times, thus saving computational resources from being expended unnecessarily.

In non-limiting embodiments, the scope of the event entities in the event database 110 that are compared to the portions of the textual document 105 may be limited to those that are related to the author of the document 105. For example, the scope of event entities may include event entities that were directly parsed from the textual document 105 being edited by the author (the primary textual document) and/or event entities that were parsed from supporting documents (e.g., citations from the primary textual document to documents in the document database 102). By limiting the scope of analysis during the parsing, improvements are realized in the performance of associating (e.g., linking) mentions to event entities through saving computational resources that would otherwise be expended.

With continued reference to FIG. 1A, the event detection and linking engine 100 may be configured to parse at least one textual document 105 to identify a plurality of events relating to at least one entity. For example, a user may identify a person, place, organization, or the like to identify a plurality of associated events involving that entity. In some examples, parsing the document 105 may involve determining, for each portion of the textual document 105 associated with an event of the plurality of events, if the event corresponds to an existing event in the event database 110. In some examples, in response to determining that the event corresponds to the existing event, the event detection and linking engine 100 may automatically associate (e.g., link via a data structure) the portion of the at least one textual document and the existing event into an event entity. Likewise, in some examples, in response to determining that the event does not correspond to an existing event, the event detection and linking engine 100 may automatically generate a new event entity in the event database and link the portion of the at least one textual document to the new event entity. An event entity may be defined by a plurality of parameters, such as but not limited to event type, event date, event subject (e.g., a person or organization who initiated or controlled the event, or a place the event took place), event object (e.g., who or what the event was for), event action or predicate (e.g., a marriage, a movement, etc.), event participants, or any combination thereof.

With continued reference to FIG. 1A, in non-limiting embodiments the event detection and linking engine 100 may be configured to determine one or more temporal parameters for each event of the plurality of events based on the at least one textual document, order (e.g., sort) the plurality of events into a sequence based on the temporal parameter for each event, and generate a GUI 108 comprising a visual representation of the plurality of events on a user device based on the sequence. In non-limiting embodiments, the temporal parameter(s) for each event may include a time and/or date. In non-limiting embodiments, the temporal parameter(s) for each event may include a relative parameter (e.g., indicating that the event occurred before, after, or during one or more other events).

In non-limiting embodiments, the timespan (e.g., two temporal parameters where one parameter represents the start time and the other represents the end time) may be determined to be as short as possible (e.g., if multiple temporal parameters are determined, the event detection and linking engine 100 may select the temporal parameters representing the shortest timespan from the multiple options). In some examples, there might not be enough data available to determine a specific time or timespan, in which case the system may determine the most likely (e.g., probable) start and end times based on the available data. For example, one or more predictive models may be used to determine a timespan. The temporal parameters may be determined as part of forming or defining an event entity. For example, if the textual document includes the statement: "After getting divorced, Mary purchased a car and then moved to Florida in May of 2020," the system does not have enough information to determine from that sentence when Mary purchased the car but can determine that the purchase was before May 2020 and after getting divorced. The data for this event (e.g., event entity) may include a data structure as follows: Event=[Subject: Mary, Predicate: Purchase, Object: Car, Timespan: (<divorce date>, <May 2020>)].

In the above-mentioned example fact pattern involving Mary, after getting divorced Mary purchased a car and then moved to Florida in May of 2020. Thus, there are at least three events. The first event (e.g., "Event1") may include the following parameters: [Subject: Mary, Predicate: Divorce, object: UNK, Timespan: (UNK, May 2020)], the second event (e.g., "Event2") may include the following parameters: [Subject: Mary, Predicate: Purchase, object: car, Timespan(<divorce date>, May 2020)], and the third event (e.g., "Event3") may include the following parameters: [Subject: Mary, Predicate: Travel, object: Florida, Timespan (<divorce date>, May 2020)]. The word "After", when detected, may cause the algorithm to determine that Event1 comes before Event2, and the word "Then", when detected, may cause the algorithm to determine that Event2 comes before Event3. The events may be linked to form a sequence of events as follows: Event1→Event2→Event3. Linking events may include including a pointer as a parameter in one event that identifies a preceding or succeeding event and/or recording the sequence in a database.

In non-limiting embodiments, when the events are shown on a timeline, even if the system has not determined all of the dates the sequence may still be accurate based on the relative sequence of each of the events with respect to the other events. To determine more precise, narrower timespans, the system may be configured to process other documents (e.g., from document database 102) and link events together. For example, if there is a record document that has information about when a car was purchased, the system may be able to extract a fourth event (e.g., "Event4") with the following parameters: [Subject Mary Doe, Predicate Purchase, object car, Timespan(Apr. 10, 2020, Apr. 10, 2020)]. By comparing the subject, type, and object, the system may match this event to the second event (e.g., "Event2") based on matching parameters and update the time span for the second event.

In non-limiting embodiments, a machine-learning model may be used to score the events based on how likely (e.g., probable) they are to be related. This may take the form of a decision tree, for example, represented as: prob_related=Model.predict(Event2, [Event1, Event3, Event4, . . . ]). Various other representations, variables, and functions may be used. Assigning probability scores allows the system to pick those events that have a probability higher than a certain threshold as candidates. If the results are ambiguous (e.g., probability scores failing to satisfy a threshold), the user might be prompted to provide feedback as to whether or not events are related in non-limiting embodiments. User feedback may then be used to improve the machine-learning model by adjusting and/or training the model.

In non-limiting embodiments, the system 1000 may infer a time span from the context (e.g., a brief and record documents in some examples), and present the information to the user. When the time span is not well defined, it may appear on the timeline as a "long event" or may be marked as ambiguous (e.g., confidence is below a threshold). The user may then have the option to add additional information to the document to clarify when the event took place or manually correct the time span information for the event which might be used as feedback to improve the time span inference algorithm. If the user adds more information, the timeline will reflect the new data after the documents are re-analyzed and the event database 110 is updated.

In some examples, selection of an event causes the interactive GUI 108 to automatically display at least a portion of the textual document 105 related to the event or at least one other document related to the event. The interactive GUI 108 may include a plurality of selectable options linked to portions of the textual document 105 or at least one other document (e.g., such as a document from document database 102) such that, when selected, a corresponding portion of the textual document 105 or the at least one other document is annotated. For example, an annotation may include an identifier, icon, comment, numeral, highlight, and/or any other visual representation that associates a portion of the textual document with an event. Displaying a portion of the textual document 105 may include highlighting a subsection of text, emphasizing a subsection of text, enlarging a subsection of text, displaying a subsection of text in a pop-up window, displaying a subsection of text in a frame of the interactive user interface, and/or the like.

In non-limiting embodiments, the event detection and linking engine 100 detects at least one key date or time period associated with at least a subset of events of the plurality of events. This key date or time period may form part of the visual representation shown on the interactive GUI 108. A key date or time period may refer to a date or time period that is directly related to the event (e.g., a starting date and/or time, an ending date and/or time, and/or the like).

In non-limiting embodiments, key dates may be extracted. When a key date is detected, the timeline visualization may help retrieve all records that relate to this date and a list of witnesses. The system may help create memoranda (e.g., for in-house use or the like) or legal briefs that link back to the source documents (e.g., forms, interview notes, transcripts, and/or the like). All documents related to a matter may be parsed, not just the document being edited. In non-limiting embodiments, a timeline may be generated from different perspectives. The retelling of events may differ depending on the perspective. The timeline may show the names of witnesses in a testimony. In non-limiting embodiments, a filter may be applied to select one or more witnesses, places, dates and/or date ranges, and/or the like. For example, a filter may be presented as a drop-down menu or list of witnesses, and upon selection of a witness the timeline may be generated by filtering the data by the selected witness. It will be appreciated that various selectable options may be provided to configure a filter, such as input boxes, check boxes, drop-down menus, lists, tags, and/or the like.

In some non-limiting embodiments, the timeline may show all witnesses for a testimony for key dates. At each key date, the name of each witness may appear as hyperlinked text. The text can be linked to source documents, such as interview notes (e.g., HR investigation) or a transcript (e.g., a witness deposition). The timeline can be generated dynamically from the knowledge graph (e.g., based on the real-time structure of the graph), such that the timeline is a "view" and not a static file. However, in some non-limiting examples, the timeline and/or timeline view may be output (e.g., exported) as one or more static files. In some non-limiting examples, an API may be provided to provide access to the timeline and/or knowledge graph, such that the API may be queried for the timeline and/or specific views of the timeline.

In non-limiting embodiments or aspects, the interactive GUI 108 is generated in a frame of a word processing application. The word processing application may be used by a user to edit the textual document 105 and may parse and process the textual document while the user is editing and/or viewing the textual document 105 through the application. In some examples, the word processing application may include a plug-in extension (e.g., an add-in program, script, and/or tool, such as an application toolbar, web browser extension, or the like) that is configured to parse and process the textual document while the user is editing and/or viewing the textual document 105 through the application. Such a plug-in extension may utilize, for example, one or more APIs of the word processing application to integrate with the same.

In non-limiting embodiments, the view of the events shown in a timeline may be generated dynamically by a query that is related to the user's interest or role (e.g., author, editor, viewer, etc.). For example, an author may be associated with a case of interest, and that case of interest may be associated with a plurality of events (e.g., author→case of interest→events related to that case of interest).

In non-limiting embodiments, the interactive GUI 108 may provide an option to share data, such as one or more views of the interactive GUI 108, with one or more other users and/or computing devices. For example, upon sharing the legal brief, a hyperlink may be created to link to the content for each fact of a timeline (e.g., a source document), link to a record for a legal authority, and/or link within the brief where the fact was identified. In non-limiting examples, the timeline may be embedded in the document (e.g., legal brief). There may be more than one link per fact. Further, the timeline may be configured with different links based on the role of the recipient. For example, the links can be different based on the role of the user reading the legal brief. The link to a legal brief, for example, may be a link to an editable version of the document (e.g., a word processing document) if the user is the author or an editor, or a link to a non-editable version of the document (e.g., a PDF document). The ability to share a timeline or interactive GUI 108 may be provided from within a shared workspace for a team, for example. Each matter or case may be saved as a workspace data structure, and there may be access control rights for each workspace. A workspace may store all documents related to a matter or case. A workspace data structure may include data storage beyond the textual document. In Microsoft Word®, for example, a side panel may show a list of associated matters (workspaces) linked to the user's organization.

Figure 1B:
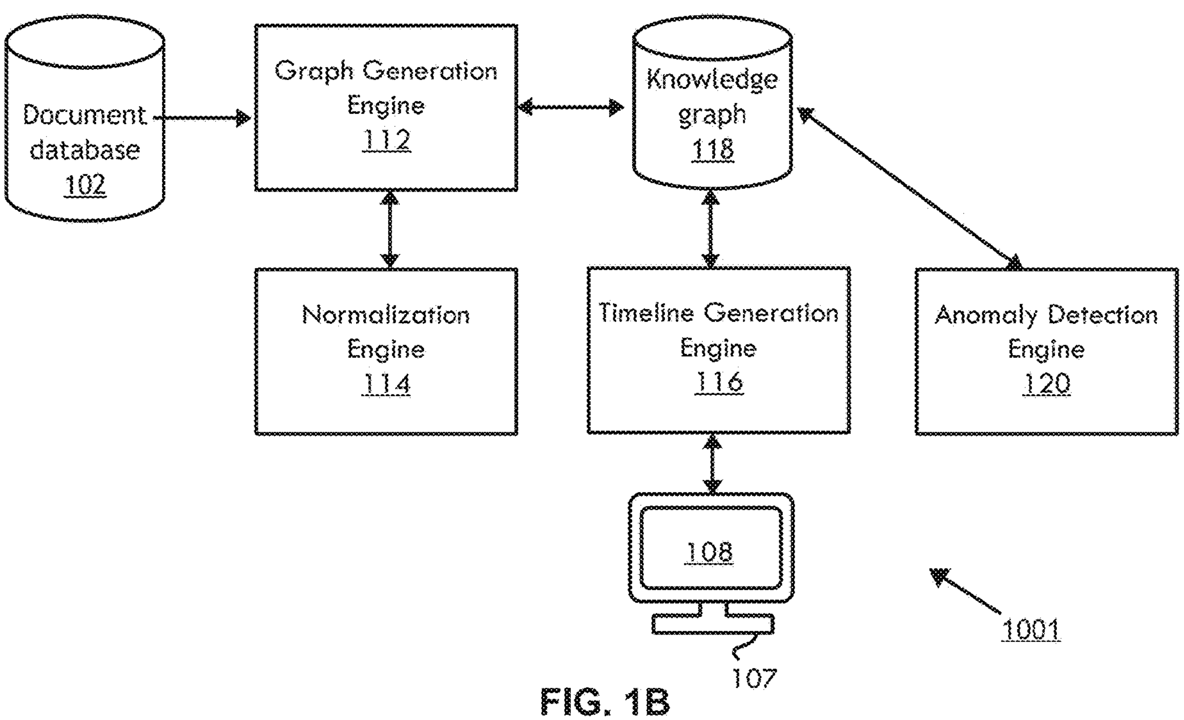
FIG. 1B is another schematic diagram of a system for identifying events in electronic documents and for representing events in an interactive graphical user interface according to non-limiting embodiments.

Referring now to FIG. 1B, depicted is a system 1001 for identifying events and representing events in an interactive GUI according to some non-limiting embodiments. The system 1001 includes a graph generation engine 112, a normalization engine 114, a timeline generation engine 116, and an anomaly detection engine 120, each of which may include one or more computing devices and/or software applications executed by one or more computing devices. In some non-limiting embodiments, the graph generation engine 112, normalization engine 114, timeline generation engine 116, and anomaly detection engine 120 may be part of the event detection and linking engine 101 shown in FIG. 1A, although it will be appreciated that other arrangements are possible. The graph generation engine 112, in non-limiting embodiments, generates a graph based on one or more documents (e.g., briefs and/or records) from parsing documents retrieved from a document database 102 and/or other sources (e.g., uploaded by a user, identified by a network address, and/or the like). The graph may be stored in memory as part of a knowledge graph database 118 or the like.

With continued reference to FIG. 1B, the normalization engine 114 may normalize one or more entity names from the documents and/or the generated graph. For example, the normalization engine 114 may determine that references to "John" and "Mr. Doe" both relate to "John Doe" and, as a result, may change "John" and "Mr. Doe" to "John Doe" in the graph and/or in memory. The normalization engine 114 may normalize one or more entity names before, concurrent with, or after generation of the graph. In non-limiting embodiments, the anomaly detection engine 120 may be configured to compare the knowledge graph stored in memory 118 with one or more rules and/or one or more existing graphs (e.g., standardized graphs created from historical data) and identify anomalies such as missing entities, attributes, or documents, and/or inconsistencies in the data. For example, the anomaly detection engine 120 may compare the knowledge graph in memory 118 for a particular entity to one or more previously-generated knowledge graphs for the same or other entities (e.g., graphs for entities associated with events for a selected entity).

Still referring to FIG. 1B, the timeline generation engine 116 may generate one or more timelines that are visually represented on an interactive GUI 108 of a user computing device 107. The timeline generation engine 116 may generate a visual timeline from the knowledge graph stored in memory 118. In some examples, the timeline generation engine 116 may also output one or more structured data files to represent the events and entities of the knowledge graph such that one or more other systems may process the data file. In non-limiting embodiments, an operator of the user computing device 107 may interact with the knowledge graph and/or timeline. For example, in non-limiting embodiments a user may interact with the timeline to make corrections and/or edits, and such corrections may be used as feedback to train and/or influence one or more algorithms used to generate the timeline (e.g., the timeline generation engine 116). As an example, error terms calculated based on the difference between the generated timeline and the edited timeline may be incorporated into a predictive model.

Figure 2:
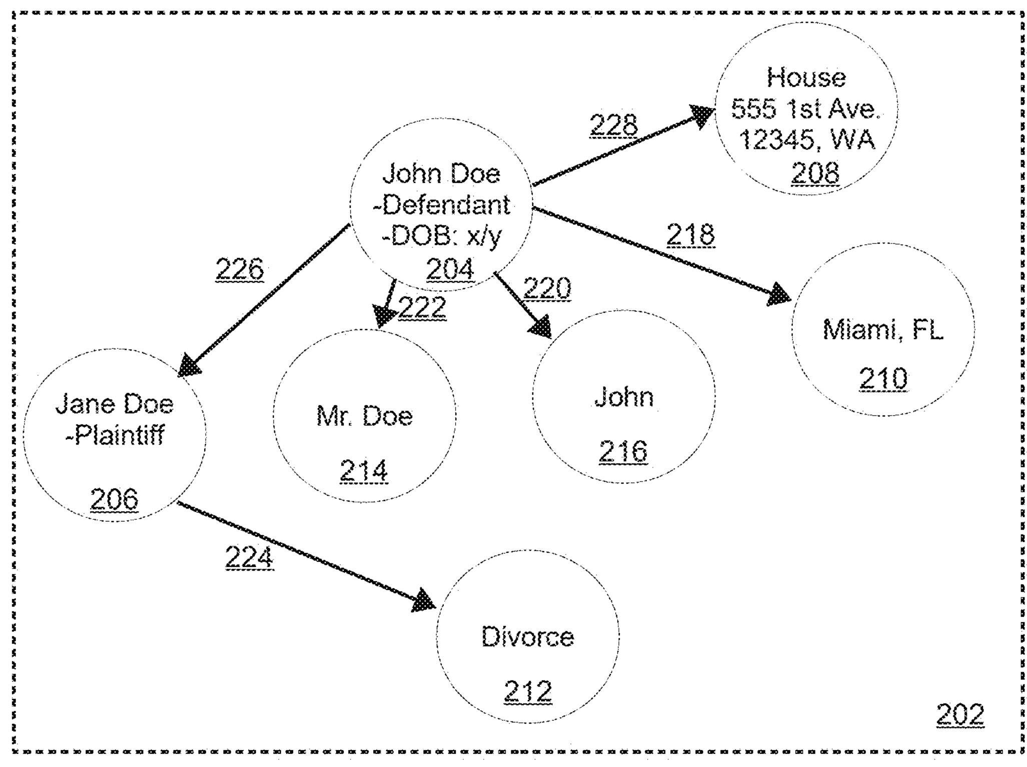
FIG. 2 is a diagram of a knowledge graph used in a system for identifying events in electronic documents and for representing events in an interactive graphical user interface according to non-limiting embodiments.

Referring now to FIG. 2, a graph data structure 202 is shown according to some non-limiting embodiments. Nodes 204, 206, 208, 210, 212, 214, and 216 represent entities. The term "entity," as used herein, refers to a person, living being, object, place, or event. For example, the nodes in FIG. 2 include an entity node 206 for Jane Doe, an entity node 204 for John Doe, an entity node 208 for a house, an entity node 210 for a region, and an entity node 212 for an event. The graph data structure 202 may also include entity nodes that represent the same entity but have different data (e.g., a different spelling) associated with it that results in the creation of a separate entity node. For example, entity nodes 214 and 216 are both aliases of John Doe. Whether the entity nodes 214 and 216 are linked and treated as a single node may be dependent on a confidence score associated with each node.

The entity nodes in the graph data structure 202 are connected based on relation, such that the edges (e.g., connections) 218, 220, 222, 224, 226, and 228 represent a relation between two entities. For example, in the example shown in FIG. 2, connection 226 represents a legal relationship (e.g., married). Connections 220 and 222 both relate entity nodes 214, 216 to entity node 204 as an alias relation. Connection 218 represents a relation between John Doe, entity node 204, and Miami, Florida, entity node 210. The connection 218 may be a relation, showing a connection between John Doe and Florida, or may be as specific as showing that John Doe currently lives in Florida, previously lived in Florida, is planning to travel to Florida, and/or the like. Further, connection 224 represents an action (e.g., initiating a legal proceeding) relating Jane Doe, represented by entity node 206, with a divorce event, represented by entity node 212. Entity nodes may be represented by programmatic objects or other like individual data structures to hold one or more attribute values (e.g., entity type, entity details, and/or the like). For example, entity node 204 may store an entity type having the value of "person," and one or more attributes specific to a person entity type such as, for example, a name, date of birth, age, and/or the like. As another example, entity node 208 may store an entity type having the value of "location" or "object," and one or more attributes specific to a location or object entity type such as, for example, an address or coordinates. In non-limiting embodiments, related entity nodes may include at least one subject entity node (e.g., entity node 204 representing a person) and at least one object entity node (e.g., entity node 208 representing an object).

Figure 3:
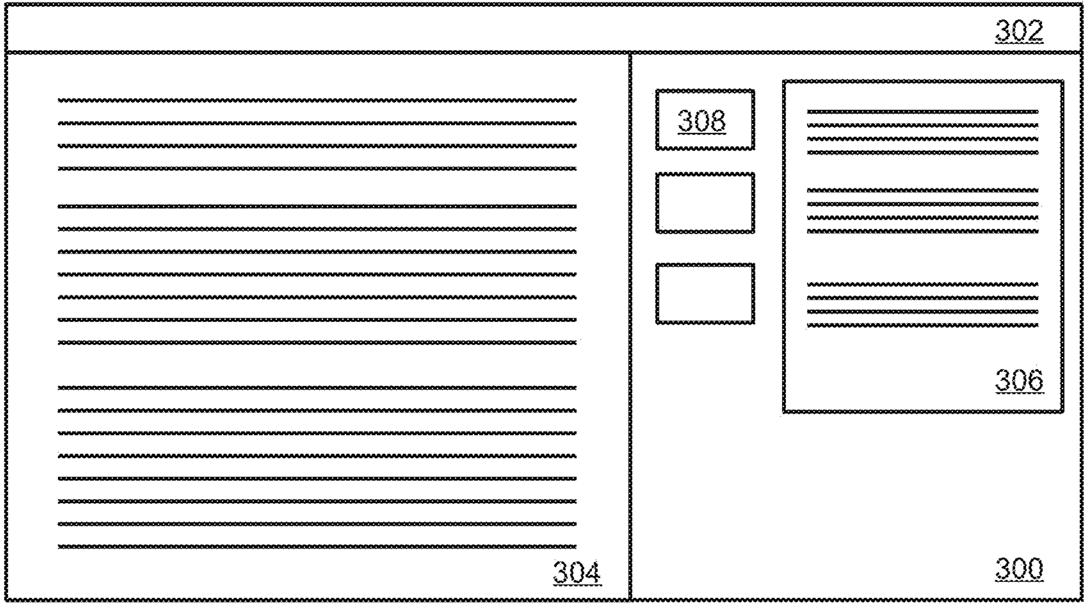
FIG. 3 is a view of a graphical user interface according to non-limiting embodiments.

Referring now to FIG. 3, a GUI 300 is shown as part of a window in a word processing application 302 according to non-limiting embodiments. The word processing application 302 includes a text editing window 304 in which a textual document is shown and edited. The GUI 300 may include one or more tools for interacting with the textual document, such as one or more timeline tools 308. The GUI 300 may include a preview window 306 showing a second textual document (e.g., such as a source document). In non-limiting embodiments, the GUI 300 may facilitate a user to upload documents (e.g., submit additional documents to a database or library of documents) and to generate and/or view a timeline of events based on the textual document in the text editing window 304 and/or the documents in a document database.

Figure 4:
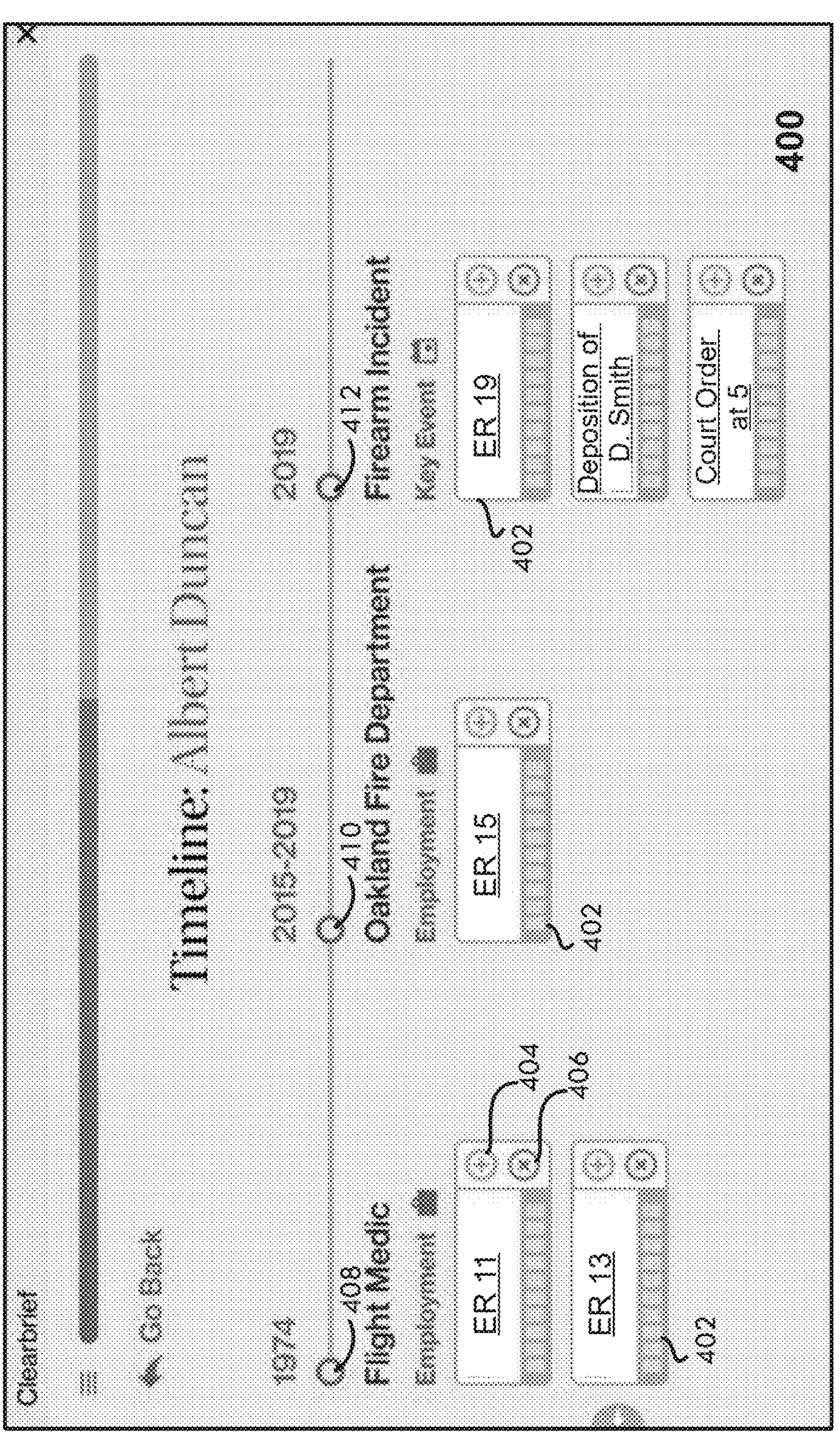
FIG. 4 is another view of a graphical user interface according to non-limiting embodiments.

Referring now to FIG. 4, a timeline GUI 400 is shown according to non-limiting embodiments. In some examples, the timeline GUI 400 may be part of a window in a word processing application (e.g., GUI 300 in FIG. 3). The timeline GUI 400 shows an example timeline for an entity ("Albert Duncan") based on a plurality of events involving that entity. For example, after one or more textual documents have been parsed, the event database may be queried based on an entity. Such a database query may occur upon user request, such as selecting and/or inputting the name of an entity. For example, a user may identify a person, place, organization, and/or the like to generate a timeline for the entity. In some non-limiting embodiments, the timeline GUI 400 may be automatically generated in response to the return of the query.

As shown in FIG. 4, the timeline GUI 400 may show the events associated with the entity in chronological sequence. In the depicted example, the events include employment as a flight medic in 1974 and by the Oakland Fire Department in 2015-2019. The depicted events also include a firearm incident that occurred in 2019. Although specific dates and date ranges may not be known or determinable from the document(s), enough data is available to place the three events into a chronological sequence. In non-limiting embodiments, a plurality of source documents (e.g., excerpts of record ("ER"), deposition transcript, and a court order) corresponding to events are also identified and shown as document objects 402 on the timeline GUI 400. The document objects 402 in some examples may be depicted as cards as in FIG. 4. The document objects 402 may include a hyperlink to display the corresponding document, a first selectable option 404 for positive feedback, and a second selectable option for negative feedback 406. In non-limiting embodiments the positive feedback may confirm that the corresponding source document (e.g., "ER 11") is accurate. In some non-limiting embodiments, one or more document objects (e.g., cards) may identify a portion (e.g., line, paragraph, page, and/or the like) of the textual document (e.g., a brief being edited in a word processing application) and link to that portion of the document such that selection of the document object or a link thereon causes the portion to be displayed. In some non-limiting embodiments, different colors or other visual indicators (e.g., icons or the like) may be used to identify a source of the document identified by a document object 402. For example, a document object for an excerpt of record may be green, a document object for a deposition transcript may be blue, and a document object pointing to a portion of the textual document may be orange. Other visual indicators and/or color arrangements may be used.

In some examples, the document objects 402 may be predictions for citations to be inserted into the textual document. In such examples, positive feedback may result in the citation being inserted into the document. In some examples, negative feedback may be used to train or more models (e.g., a model to predict source documents and/or citations to source documents).

Figure 5:
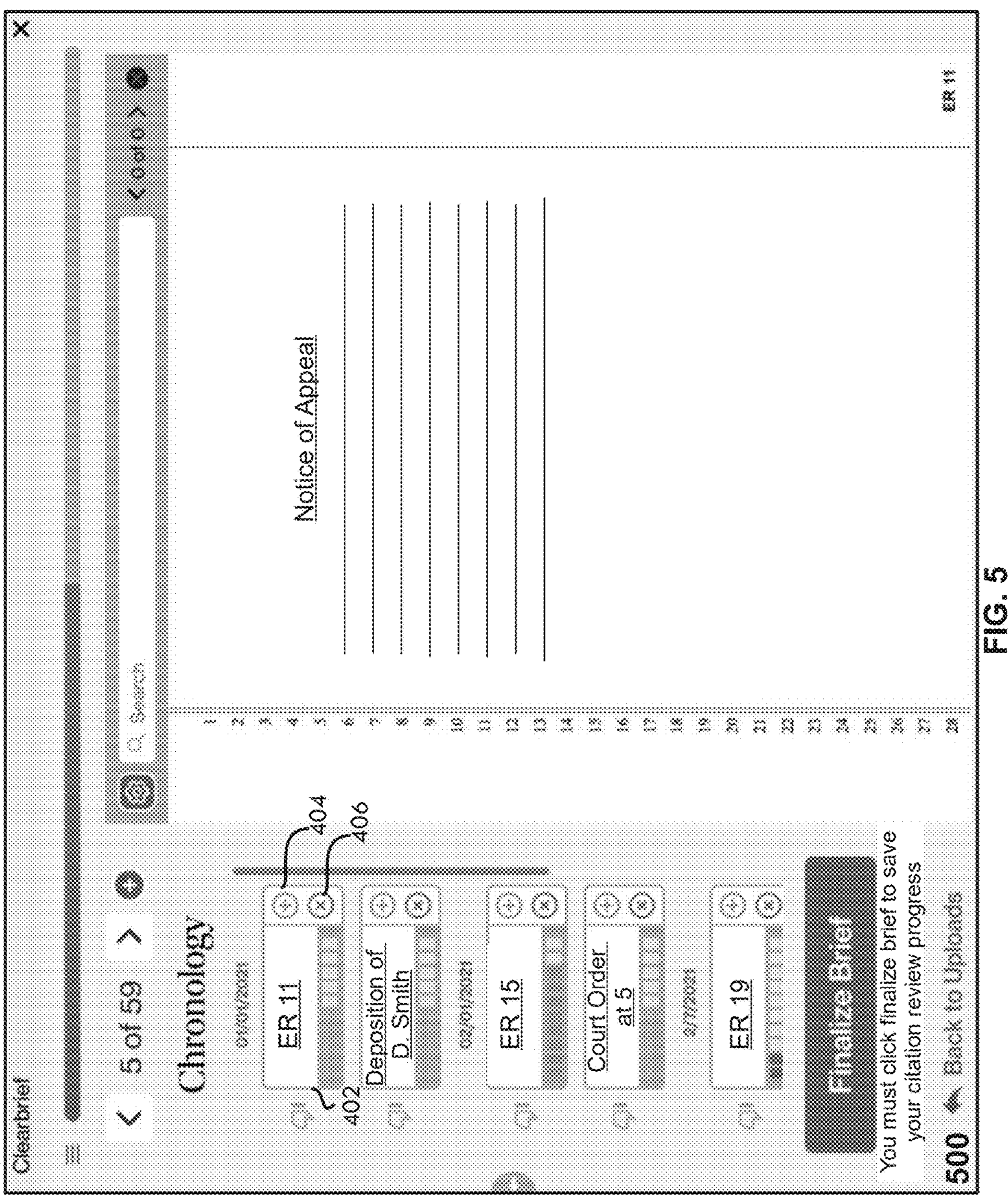
FIG. 5 is another view of a graphical user interface according to non-limiting embodiments.

Referring now to FIG. 5, a chronology GUI 500 is shown according to non-limiting embodiments. In some examples, the chronology GUI 500 may be part of a window in a word processing application (e.g., GUI 300 in FIG. 3). As shown, the chronology GUI 500 shows document objects 402 in an ordered sequence by date, such that each relevant date is displayed with corresponding document objects 402 that relate to that date (e.g., referencing the date or events associated with the date).

Figure 6:
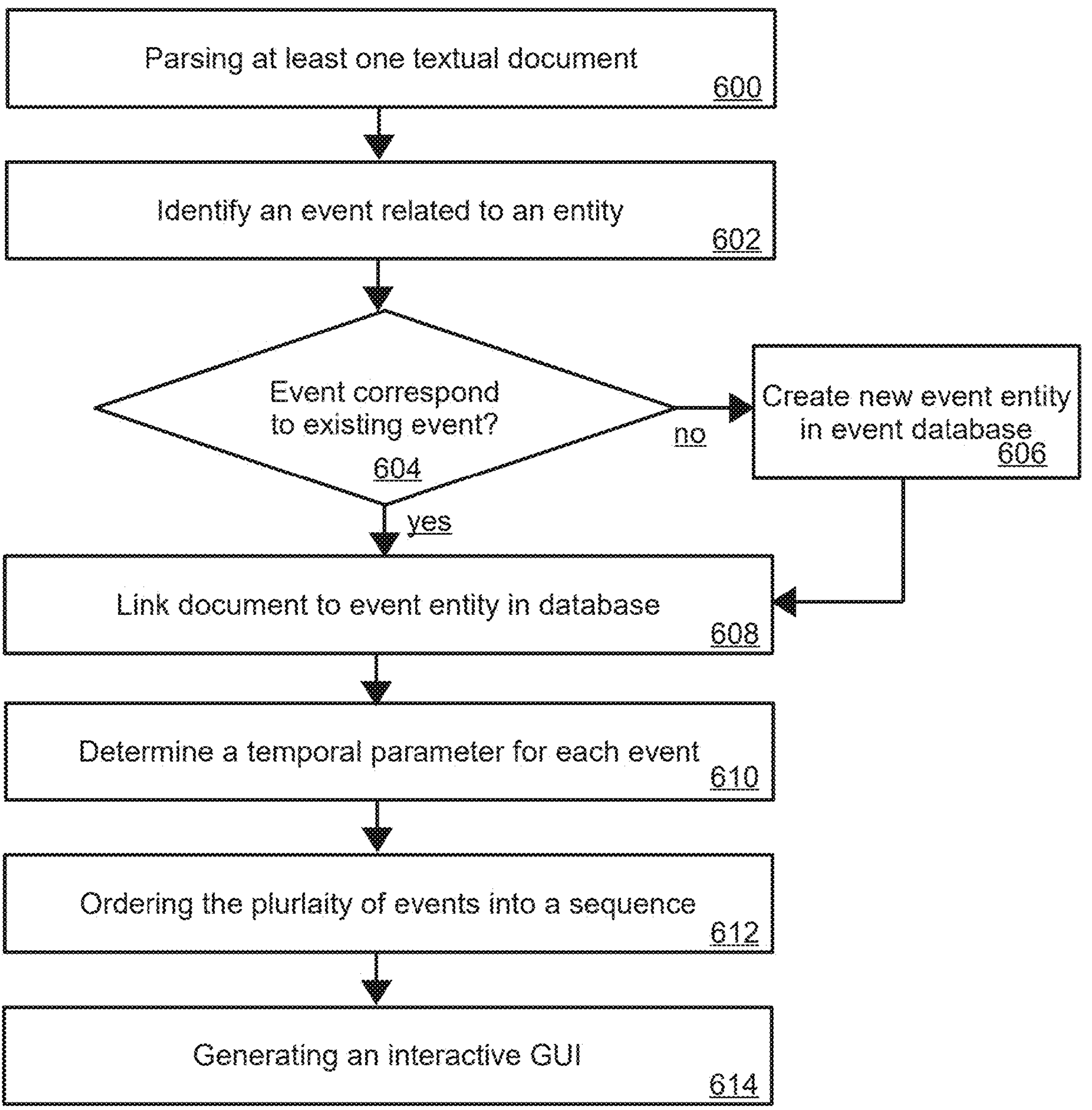
FIG. 6 is a flow diagram of a system for identifying events in electronic documents and for representing events in an interactive graphical user interface according to non-limiting embodiments.

Referring now to FIG. 6, a flow diagram for identifying events and representing a plurality of events in an interactive GUI is shown according to non-limiting embodiments. The steps shown in FIG. 6 are for example purposes only, and it will be appreciated that additional, fewer, different, and/or a different order of steps may be used in non-limiting embodiments. At step 600, one or more textual documents are parsed. The document(s) may be uploaded, selected, and/or the like. In some examples, a textual document currently open by a word processing application may be parsed as a target document. In some examples, a user may specify an entity (e.g., a person, corporation, place, and/or the like) to direct the parsing. At step 602, during the parsing, an event is identified that is related to an entity (e.g., such as an entity specified by a user). An event may be identified with a portion of a textual document (e.g., a string including a portion of a sentence or multiple sentences).

At step 604 of FIG. 6, for each event identified at step 602, it is determined if the event corresponds to an existing event in an event database. For example, the portion of the textual document and/or an event entity derived from the portion of the textual document may be compared against the event database to find a match. If the event is not in the event database (e.g., if the event entity is not recorded in the event database), the method may proceed to step 606 and a new event entity may be created in the event database. If the event is in the event database (e.g., if the event entity is recorded in the event database), the method may proceed directly to step 608. At step 608, the textual document (e.g., the portion of the textual document identifying the event) is linked to the event entity in the event database. For example, linking may include embedding metadata such as a pointer into the document and/or recording, in the event database, the portion of the textual document or a location of the same within the document.

At step 610 of FIG. 6, a temporal parameter may be determined for each event identified in the textual document. For example, a temporal parameter may be determined from an explicit recitation of a time and/or date. In other examples, a temporal parameter may be a relative parameter (e.g., before, after, or during an event). As explained herein, one or more predictive models may be used in some non-limiting embodiments to determine the temporal parameter(s). The temporal parameter(s) may be stored in the event database in association with the corresponding event entity. At step 612, the events may be ordered into a sequence based on the associated temporal parameter(s). This may include, for example, ordering the events associated with temporal parameters having explicit times and/or dates and then arranging any remaining events among the ordered events based on relative temporal parameters and/or probable temporal parameters. In some non-limiting embodiments, the sequence may be checked for anomalies and/or inconsistencies. At step 614, an interactive GUI is generated based on the ordered sequence of events. Other outputs may include a textual summary, a structured data file, and/or the like.

Although several of the examples discussed herein relate to legal documents, such as legal briefs and memoranda, it will be appreciated that the systems and methods may be applied to any type of textual documents including facts, such as reports (e.g., customer service reports, insurance claim documentation, police reports, and/or the like), research papers, articles, and/or the like. Non-limiting embodiments may speed up the reading and improve comprehension of any type of textual document containing facts. There are multiple situations where a visual timeline can be used for conveying information about facts in a concise and clear manner. In companies, the human resources (HR) department can start investigating particular employees responsive to complaints. These investigations may be documented in textual documents that contain facts that can be extracted automatically and shared as a visual timeline using non-limiting embodiments of the systems and methods described herein.

Figure 8:
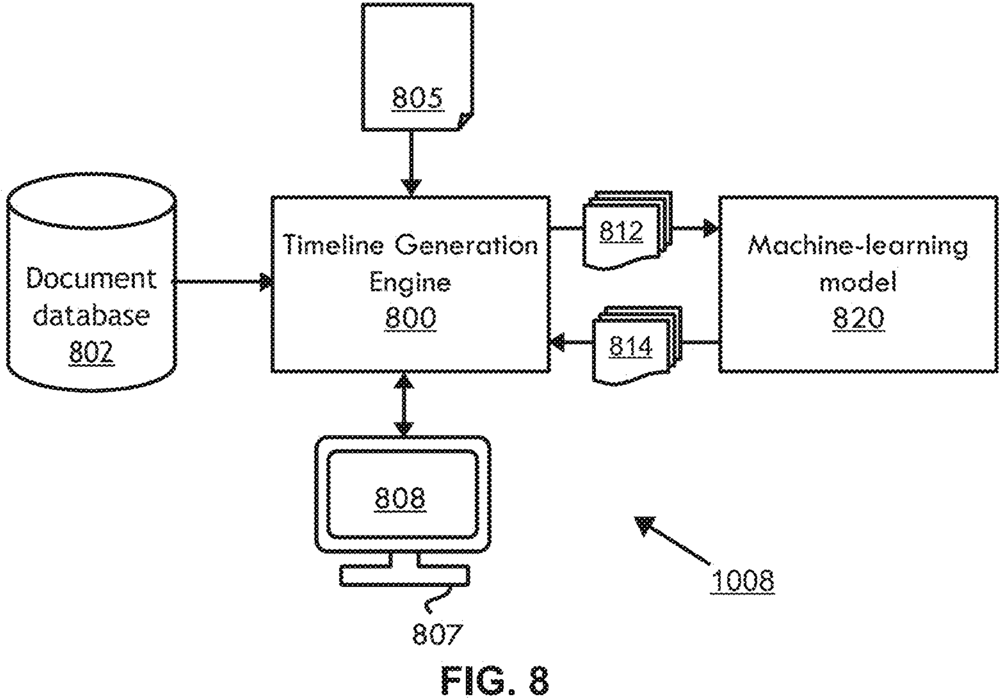
FIG. 8 is a schematic diagram of a system for identifying events in electronic documents and for identifying and representing events using a machine-learning model according to non-limiting embodiments.

In non-limiting embodiments, provided is a system and method to generate one or more narrative summaries from a generated timeline. For example, FIG. 8 depicts a system 1008 for generating a narrative summary from a timeline according to non-limiting embodiments. The system 1008 includes a timeline generation engine 800 and document database 802, both of which may be the same as the timeline generation engine 116 and database 102, respectively, described in connection with FIG. 1B. The timeline generation engine 800 may be configured to parse a target document 805 to identify a plurality of events associated a plurality of document citations within the target document 805. The document citations in the target document 805 may each correspond to a document (e.g., such as a source document) stored in the document database 802.

With continued reference to FIG. 8, the timeline generation engine 800 may extract an event summary and at least one temporal parameter (e.g., such as a year, month, day, hour, minute, second, and/or the like) from each document corresponding to a document citation. In some examples, this extraction may be performed with the use of one or more machine-learning models 820, which may include a Large Language Model (LLM). The machine-learning model may be remotely located from the timeline generation engine 800, such as a third-party LLM that is accessed by the timeline generation engine 800 over a network environment. For example, the machine-learning model 820 may expose one or more APIs that can be used by the timeline generation engine 800 and/or system or device to prompt the machine-learning model 820.

In non-limiting embodiments, an event summary and one or more temporal parameters may be extracted from a document by splitting the document into multiple different portions, assigning a unique identifier to each portion of the multiple different portions, and inputting a data structure 812 including the portions and associated identifiers into the machine-learning model 820 with a prompt. The document may be split into portions based on size limitations of the model or the like. The prompt may, for example, instruct the machine-learning model 820 to reference the unique identifier in association with an event summary and/or one or more temporal parameters extracted from each portion of the document. The prompt may also instruct the machine-learning model 820 to return a specified format of temporal parameter(s) for each event. For example, the prompt may instruct the machine-learning model 820 to return, for each event, a year, a month, a day, an hour, a minute, and a second, and to record each temporal parameter in a separate field of a data structure (e.g., such as an object). The prompt may also instruct the machine-learning model 820 to return a null value (e.g., 0) for each temporal parameter it does not identify, such that each field has a positive or null value. In some non-limiting embodiments, the prompt may also instruct the machine-learning model 820 to classify the event and/or event summary based on multiple different types (e.g., classifications and/or categories) of events (e.g., a dispute, a payment, a sale, and/or the like). The different types of events may be provided to the LLM 820 in the prompt (e.g., as a list) with an instruction to assign one type to each event summary and/or event.

Still referring to FIG. 8, the machine-learning model 820 may return an output 814. In non-limiting embodiments, the machine-learning model 820 is prompted to generate the output 814 as one or more data structures in a specified format, such as Javascript Object Notation (JSON), Extensible Markup Language (XML), and/or the like. As an example, the machine-learning model 820 may be prompted to return a structured object for each document portion or document, where the object includes the unique identifier associated with the document portion, one or more temporal parameters extracted from the document portion, and a textual event summary extracted from the document portion. The output 814 may include a field for every temporal parameter requested in the prompt, with a value for each that can be identified and a null value for those that cannot be identified. The input 812 and output 814 may be separate, combined as a batch, and/or the like, depending on the configuration and specification of the machine-learning model 820.

In non-limiting embodiments, different types of timelines may be provided that are associated with different types of parameters. For example, regular timelines may be generated for general legal domains and medical timelines may be generated specifically for the medical domain (e.g., injuries and other like events). Other types of domain-specific timelines may also be generated. As an example, in a regular timeline for a general legal domain, temporal parameters may include e-mail data such as subject, CC, from, to, witness name, and/or the like, associated with a date and/or time. For medical domain timelines, the system may extract predefined parameters such as medical service providers, event type (e.g., treatment, diagnosis, etc.), medical code, and/or the like, associated with a date and/or time.

In some non-limiting embodiments, the system may control which parameters are permitted to have a null value and which parameters are not. For example, an event type for medical timelines may be specified as a parameter that requires a value and may be determined by a model even if uncertain, and other parameters may be specified as a parameter that should be assigned a null value if there is no value specified and/or a specified level of uncertainty (e.g., such as witness names or other like parameters). The parameters may be identified based on user input and/or an identification of a type of document and/or case, and the parameters may be input into the machine-learning model 820 with an identification of which parameters may be assigned a null value and/or which parameters may not be assigned a null value. It will be appreciated that other variations are possible with different types of parameters and/or domains.

In non-limiting embodiments, the event summaries and/or temporal parameters may be displayed on an interactive GUI 808 on a user computing device 807. The events and event summaries may be ordered (e.g., sorted) based on the temporal parameter(s) extracted for that event. The ordering may be performed by the user device (e.g., client) or a server as a service. A user may use one or more selectable options to edit the summaries and/or temporal parameters. For example, the GUI 808 may show an interactive timeline that can be manipulated by a user to change the order of events, to change the description of events, to change the representation of temporal parameters, and/or the like. The changes from the user may be saved locally and/or remotely, such that the narrative generated is based on the changes made by the user. The timeline may be representative of one or many source documents from the document database 802. The timeline may be filtered by date range, to remove events without dates to remove events with only partial dates, and/or the like. In non-limiting embodiments, the timeline may be filtered by person, entity, place, and/or the like associated with events. In some examples, the timeline may be filtered by an event type (e.g., classification and/or category of event). The timeline may also be edited to normalize dates and/or the like.

In non-limiting embodiments, the system 1008 may generate a narrative summary based on the timeline. For example, the timeline generation engine 800 or another system or device may input the ordered event summaries and temporal parameters into the machine-learning model 820 with a prompt that instructs the machine-learning model to generate a summary. In non-limiting embodiments, the ordered event summaries may be split into portions each having a subset of event summaries, each event summary associated with one or more temporal parameters and a unique event summary identifier. The machine-learning model 820 may be instructed through the prompt to refer to the unique event summary identifiers in the narrative, which may be removed in a post-processing step, to allow the timeline generation engine 800 to organize, modify, reorder, remove duplication, and/or the like.

In non-limiting embodiments, a user may request the generation of such a summary through one or more selectable options. Additionally or alternatively, the narrative summary may be automatically generated along with the timeline. In non-limiting embodiments, a user may specify a type of narrative, such as a summary of facts, a cease-and-desist or demand letter, an investigative report, and/or the like. The different types of narratives may be associated with different templates. A template may include a document with blank portions, a set of parameters and/or guidelines, and/or the like. A template corresponding to the selected narrative type may be communicated and/or described within a prompt to the machine-learning model 820. In non-limiting embodiments, the narrative may be generated with respect to a portion of the timeline as filtered by date range, event type, entity type, place, presence of dates, and/or the like. In non-limiting embodiments, the prompt sent to the LLM 820 may be changed based on the template selected by the user, such that the prompt instructs the LLM to create a narrative of a particular type.

In non-limiting embodiments, users may upload sample documents to be used as a basis to generate one or more templates. One or more software functions may process an uploaded document and generate a custom template including layouts, languages, wording, grammar, sentence structure, style, and/or the like. In some examples, a user-provided sample document may be uploaded to the LLM with a prompt to generate a template automatically. For example, a user-provided document may be used to generate a narrative summary in the same style as the document provided by the user by generating a template that includes features from the user-provided sample document.

In non-limiting embodiments, the narrative generated may be further processed before being displayed to the user. For example, a citation to a document may be provided for each sentence. The citation may be determined by the client (e.g., user device) and/or a server as a service, and may be based on a distance (e.g., such as but not limited to a cosine similarity) between the sentence of the narrative and the corresponding portion of the cited document. A user may score the citations by analyzing the document, which may result in scores for each citation and/or sentence with citation in the narrative.

Figure 7:
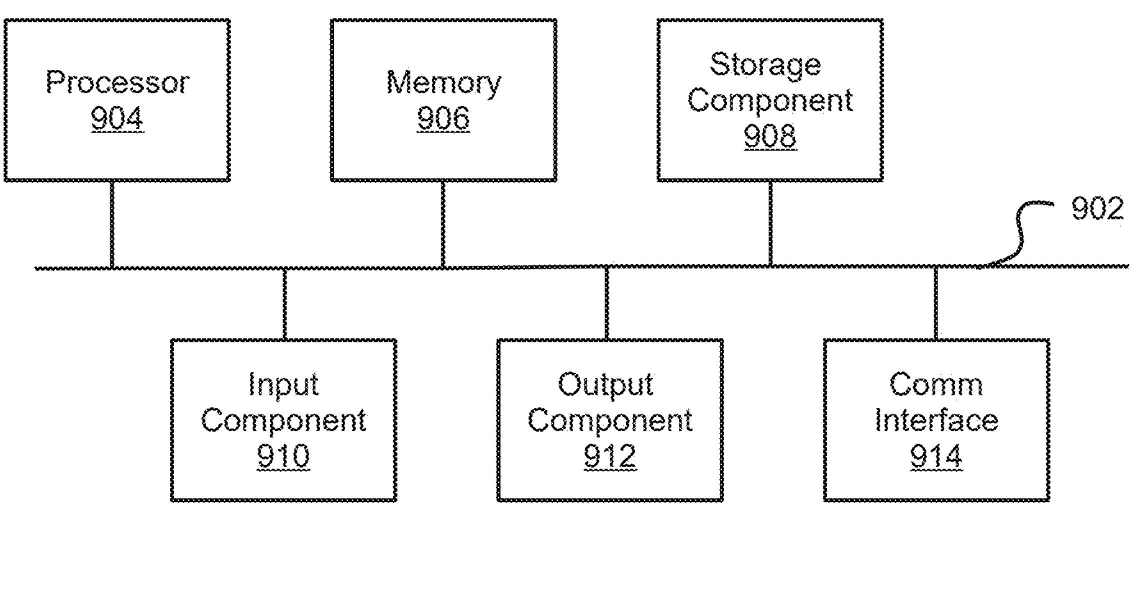
FIG. 7 illustrates example components of a device used in connection with non-limiting embodiments.

Referring now to FIG. 7, shown is a diagram of example components of a device 900 according to non-limiting embodiments. Device 900 may correspond to the event detection and linking engine 101 shown in FIG. 1A, as an example. In some non-limiting embodiments, such systems or devices may include at least one device 900 and/or at least one component of device 900. The number and arrangement of components shown are provided as an example. In some non-limiting embodiments, device 900 may include additional components, fewer components, different components, or differently arranged components than those shown in FIG. 7. Additionally, or alternatively, a set of components (e.g., one or more components) of device 900 may perform one or more functions described as being performed by another set of components of device 900.

As shown in FIG. 7, device 900 may include a bus 902, a processor 904, memory 906, a storage component 908, an input component 910, an output component 912, and a communication interface 914. Bus 902 may include a component that permits communication among the components of device 900. In some non-limiting embodiments, processor 904 may be implemented in hardware, firmware, or a combination of hardware and software. For example, processor 904 may include a processor (e.g., a central processing unit (CPU), a graphics processing unit (GPU), an accelerated processing unit (APU), etc.), a microprocessor, a digital signal processor (DSP), and/or any processing component (e.g., afield-programmable gate array (FPGA), an application-specific integrated circuit (ASIC), etc.) that can be programmed to perform a function. Memory 906 may include random access memory (RAM), read only memory (ROM), and/or another type of dynamic or static storage device (e.g., flash memory, magnetic memory, optical memory, etc.) that stores information and/or instructions for use by processor 904.

With continued reference to FIG. 7, storage component 908 may store information and/or software related to the operation and use of device 900. For example, storage component 908 may include a hard disk (e.g., a magnetic disk, an optical disk, a magneto-optic disk, a solid state disk, etc.) and/or another type of computer-readable medium. Input component 910 may include a component that permits device 900 to receive information, such as via user input (e.g., a touch screen display, a keyboard, a keypad, a mouse, a button, a switch, a microphone, etc.). Additionally, or alternatively, input component 910 may include a sensor for sensing information (e.g., a global positioning system (GPS) component, an accelerometer, a gyroscope, an actuator, etc.). Output component 912 may include a component that provides output information from device 900 (e.g., a display, a speaker, one or more light-emitting diodes (LEDs), etc.). Communication interface 914 may include a transceiver-like component (e.g., a transceiver, a separate receiver and transmitter, etc.) that enables device 900 to communicate with other devices, such as via a wired connection, a wireless connection, or a combination of wired and wireless connections. Communication interface 914 may permit device 900 to receive information from another device and/or provide information to another device. For example, communication interface 914 may include an Ethernet interface, an optical interface, a coaxial interface, an infrared interface, a radio frequency (RF) interface, a universal serial bus (USB) interface, a Wi-Fi® interface, a cellular network interface, and/or the like.

Device 900 may perform one or more processes described herein. Device 900 may perform these processes based on processor 904 executing software instructions stored by a computer-readable medium, such as memory 906 and/or storage component 908. A computer-readable medium may include any non-transitory memory device. A memory device includes memory space located inside of a single physical storage device or memory space spread across multiple physical storage devices. Software instructions may be read into memory 906 and/or storage component 908 from another computer-readable medium or from another device via communication interface 914. When executed, software instructions stored in memory 906 and/or storage component 908 may cause processor 904 to perform one or more processes described herein. Additionally, or alternatively, hardwired circuitry may be used in place of or in combination with software instructions to perform one or more processes described herein. Thus, embodiments described herein are not limited to any specific combination of hardware circuitry and software. The term "programmed or configured," as used herein, refers to an arrangement of software, hardware circuitry, or any combination thereof on one or more devices.

Although embodiments have been described in detail for the purpose of illustration, it is to be understood that such detail is solely for that purpose and that the disclosure is not limited to the disclosed embodiments, but, on the contrary, is intended to cover modifications and equivalent arrangements that are within the spirit and scope of the appended claims. For example, it is to be understood that the present disclosure contemplates that, to the extent possible, one or more features of any embodiment can be combined with one or more features of any other embodiment.

What is claimed is:

1. A system comprising:

at least one processor configured to:

parse at least one textual document to identify a plurality of events associated with a plurality of document citations in the at least one textual document, each document citation of the plurality of document citations corresponding to at least one source document separate from the at least one textual document;

extract, from at least one source document for each document citation of the plurality of document citations in the at least one textual document, an event summary and at least one temporal parameter for an event of the plurality of events corresponding to the at least one source document by inputting at least a portion of the at least one source document into a machine-learning model;

order the plurality of events into a sequence based on the at least one temporal parameter for each event;

generate an interactive graphical user interface comprising event summaries for each event on a user device based on the sequence; and generate a narrative summary based on the event summaries for each event and the sequence, wherein extracting the event summary and the at least one temporal parameter comprises:

splitting the at least one source document into a plurality of portions;

assigning a unique identifier to each portion of the plurality of portions, resulting in a plurality of unique identifiers; and prompting the machine-learning model to reference the unique identifier in association with the event summary and/or the at least one temporal parameter, wherein ordering the plurality of events into the sequence is based at least partially on the plurality of unique identifiers.

2. The system of claim 1, wherein extracting the event summary and the at least one temporal parameter comprises:

prompting the machine-learning model to return a plurality of temporal parameters as separate fields in a data structure, wherein the at least one temporal parameter is returned.

3. The system of claim 2, wherein prompting the machine-learning model to return the plurality of temporal parameters as separate fields comprises instructing the machine-learning model to return a null value in the data structure for any temporal parameters of the plurality of temporal parameters that are not identified in the at least one source document.

4. The system of claim 2, wherein the plurality of temporal parameters comprise at least two of the following: year, month, day, hour, minute, and/or second.

5. The system of claim 1, wherein the at least one processor is further configured to:

generate a data structure comprising an association between each portion of the plurality of portions and a unique identifier of the plurality of unique identifiers, wherein inputting the at least a portion of the at least one source document into the machine-learning model comprises inputting the data structure into the machine-learning model when prompting the machine-learning model.

6. The system of claim 1, wherein the at least one processor is further configured to:

modify the sequence and/or at least one event summary based on user input to the interactive graphical user interface before generating the narrative summary.

7. The system of claim 1, wherein the at least one processor is further configured to:

receive a user selection from a plurality of selectable options, each option of the plurality of selectable options corresponding to a separate type of narrative summary, wherein the narrative summary is generated based on a selected type of narrative summary.

8. The system of claim 7, wherein generating the narrative summary comprises:

identifying a template corresponding to the selected type of narrative summary from a plurality of different templates; and prompting the machine-learning model with the template.

9. The system of claim 1, wherein generating the narrative summary comprises:

generating a data structure comprising the event summaries for each event; and inputting the data structure into the machine-learning model.

10. A method for representing a plurality of events in an interactive graphical user interface, comprising:

parsing at least one textual document to identify a plurality of events associated with a plurality of document citations in the at least one textual document, each document citation of the plurality of document citations corresponding to at least one source document separate from the at least one textual document;

extracting, from at least one source document for each document citation of the plurality of document citations in the at least one textual document, an event summary and at least one temporal parameter for an event of the plurality of events corresponding to the at least one source document by inputting at least a portion of the at least one source document into a machine-learning model;

ordering the plurality of events into a sequence based on the at least one temporal parameter for each event;

generating an interactive graphical user interface comprising event summaries for each event on a user device based on the sequence; and generating a narrative summary based on the event summaries for each event and the sequence, wherein extracting the event summary and the at least one temporal parameter comprises:

splitting the at least one source document into a plurality of portions;

assigning a unique identifier to each portion of the plurality of portions, resulting in a plurality of unique identifiers; and prompting the machine-learning model to reference the unique identifier in association with the event summary and/or the at least one temporal parameter, wherein ordering the plurality of events into the sequence is based at least partially on the plurality of unique identifiers.

11. The method of claim 10, wherein extracting the event summary and the at least one temporal parameter comprises:

prompting the machine-learning model to return a plurality of temporal parameters as separate fields in a data structure, wherein the at least one temporal parameter is returned.

12. The method of claim 11, wherein prompting the machine-learning model to return the plurality of temporal parameters as separate fields comprises instructing the machine-learning model to return a null value in the data structure for any temporal parameters of the plurality of temporal parameters that are not identified in the at least one source document.

13. The method of claim 11, wherein the plurality of temporal parameters comprise at least two of the following: year, month, day, hour, minute, and/or second.

14. The method of claim 10, further comprising:

generating a data structure comprising an association between each portion of the plurality of portions and a unique identifier of the plurality of unique identifiers, wherein inputting the at least a portion of the at least one source document into the machine-learning model comprises inputting the data structure into the machine-learning model when prompting the machine-learning model.

15. The method of claim 10, further comprising:

modifying the sequence and/or at least one event summary based on user input to the interactive graphical user interface before generating the narrative summary.

16. The method of claim 10, further comprising:

receiving a user selection from a plurality of selectable options, each option of the plurality of selectable options corresponding to a separate type of narrative summary, wherein the narrative summary is generated based on a selected type of narrative summary.

17. The method of claim 16, wherein generating the narrative summary comprises:

identifying a template corresponding to the selected type of narrative summary from a plurality of different templates; and prompting the machine-learning model with the template.

18. The method of claim 10, wherein generating the narrative summary comprises:

generating a data structure comprising the event summaries for each event; and inputting the data structure into the machine-learning model.

19. A computer program product comprising a non-transitory computer-readable medium including program instructions that, when executed by at least one processor, cause the at least one processor to:

parse at least one textual document to identify a plurality of events associated with a plurality of document citations in the at least one textual document, each document citation of the plurality of document citations corresponding to at least one source document separate from the at least one textual document;

extract, from at least one source document for each document citation of the plurality of document citations in the at least one textual document, an event summary and at least one temporal parameter for an event of the plurality of events corresponding to the at least one source document by inputting at least a portion of the at least one source document into a machine-learning model;

order the plurality of events into a sequence based on the at least one temporal parameter for each event;

generate an interactive graphical user interface comprising event summaries for each event on a user device based on the sequence; and generate a narrative summary based on the event summaries for each event and the sequence, wherein extracting the event summary and the at least one temporal parameter comprises:

splitting the at least one source document into a plurality of portions;

assigning a unique identifier to each portion of the plurality of portions, resulting in a plurality of unique identifiers; and prompting the machine-learning model to reference the unique identifier in association with the event summary and/or the at least one temporal parameter, wherein ordering the plurality of events into the sequence is based at least partially on the plurality of unique identifiers.

* * * * *